United States Patent [19]

Furuhashi

[11] Patent Number: 5,539,716
[45] Date of Patent: Jul. 23, 1996

[54] OPTICAL RECORDING DISC WITH COMPRESSED AUDIO PCM DATA INTERLEAVED WITH VIDEO DATA

[75] Inventor: Makoto Furuhashi, Kanagawa, Japan

[73] Assignee: Sony Corporation, Tokyo, Japan

[21] Appl. No.: 344,402

[22] Filed: Nov. 23, 1994

Related U.S. Application Data

[63] Continuation of Ser. No. 976,900, Nov. 16, 1992, abandoned.

[30] Foreign Application Priority Data

Nov. 22, 1991 [JP] Japan ................... 3-333911

[51] Int. Cl.$^6$ ................................................ G11B 3/90
[52] U.S. Cl. ................................. 369/59; 369/47
[58] Field of Search ................... 369/47, 48, 49, 369/59

[56] References Cited

U.S. PATENT DOCUMENTS 4,829,497  5/1989  Sako et al. ................... 369/50
4,896,311  1/1990  Ishihara ....................... 360/25
5,224,087  6/1993  Maeda et al. ................. 369/54

FOREIGN PATENT DOCUMENTS 0233783  8/1987  European Pat. Off. .
0238194  9/1987  European Pat. Off. .
0440224  8/1991  European Pat. Off. .
0463183  1/1992  European Pat. Off. .
0464216  1/1992  European Pat. Off. .
9111002  1/1991  WIPO .
9111003  7/1991  WIPO .

*Primary Examiner*—W. Chris Kim
*Attorney, Agent, or Firm*—Jay H. Maioli

[57] ABSTRACT

Compressed audio signal data on a CD-ROM disc at a data transfer rate higher than the standard rate. Information indicating the increased data transfer rate is recorded on the disc, and the compressed audio signal data as recorded are interleaved on the disc are interleaved in accordance with the increased data transfer rate.

4 Claims, 11 Drawing Sheets

F I G. 2
(PRIOR ART)

| FORMAT | LEVEL AND SOUND SYSTEM | SAMPLING FREQUENCY | BIT COUNT | FREQUENCY BAND | INTERLEAVING FACTOR |
|---|---|---|---|---|---|
| a | STEREO | 37.8 kHz | 8 | 17 kHz | 2 |
| b | MONAURAL | 37.8 | 8 | 17 | 4 |
| c | STEREO | 37.8 | 4 | 17 | 4 |
| d | MONAURAL | 37.8 | 4 | 17 | 8 |
| e | STEREO | 18.9 | 4 | 8.5 | 8 |
| f | MONAURAL | 18.9 | 4 | 8.5 | 16 |

FIG. 3
(PRIOR ART)

| FORMAT | LEVEL AND SOUND SYSTEM \ BLOCK | 0 | 1 | 2 | 3 | 4 | 5 | 6 | 7 | 8 | 9 | 10 | 11 | 12 | 13 | 14 | 15 | 16 | 17 | ... |
|---|---|---|---|---|---|---|---|---|---|---|---|---|---|---|---|---|---|---|---|---|
| a | STEREO | ○ |  | ○ |  | ○ |  | ○ |  | ○ |  | ○ |  | ○ |  | ○ |  | ○ |  |  |
| b | MONAURAL | ○ |  |  |  | ○ |  |  |  | ○ |  |  |  | ○ |  |  |  | ○ |  |  |
| c | STEREO | ○ |  |  |  | ○ |  |  |  | ○ |  |  |  | ○ |  |  |  | ○ |  |  |
| d | MONAURAL | ○ |  |  |  |  |  |  |  | ○ |  |  |  |  |  |  |  | ○ |  |  |
| e | STEREO | ○ |  |  |  |  |  |  |  | ○ |  |  |  |  |  |  |  | ○ |  |  |
| f | MONAURAL | ○ |  |  |  |  |  |  |  |  |  |  |  |  |  |  |  | ○ |  |  |

BLOCK TRAIN →

1/75 sec. = 1 BLOCK

| COLOR NUMBER | 0 | 1 | 2 | - - - - - - | 15 |
|---|---|---|---|---|---|
| DATA OF 0-TH PALETTE | COLOR DATA (IN 15 BITS) | COLOR DATA | COLOR DATA | - - - - - - | COLOR DATA |

↳ COLOR NUMBER TABLE COL(0)

| COLOR NUMBER | 0 | 1 | 2 | - - - - - - | 15 |
|---|---|---|---|---|---|
| DATA OF FIRST PALETTE | COLOR DATA | COLOR DATA | COLOR DATA | - - - - - - | COLOR DATA |

↳ COLOR NUMBER TABLE COL(1)

| COLOR NUMBER | 0 | 1 | 2 | - - - - - - | 15 |
|---|---|---|---|---|---|
| DATA OF SEVENTH PALETTE | COLOR DATA | COLOR DATA | COLOR DATA | - - - - - - | COLOR DATA |

↳ COLOR NUMBER TABLE COL(7)

FIG. 11

| FORMAT | LEVEL AND SOUND SYSTEM | BLOCK / BLOCK TRAIN → |
|---|---|---|
| a | STEREO | (markings at blocks 0, 3, 13, 22, 32) |
| b | MONAURAL | (markings at blocks 0, 8, 16, 32) |
| c | STEREO | (markings at blocks 0, 8, 16, 32) |
| d | MONAURAL | (markings at blocks 0, 16, 32) |
| e | STEREO | (markings at blocks 0, 16, 32) |
| f | MONAURAL | (markings at blocks 0, 32) |

1 BLOCK = 1/75 sec., subdivision = 1/150 sec.

OPTICAL RECORDING DISC WITH COMPRESSED AUDIO PCM DATA INTERLEAVED WITH VIDEO DATA

This is a continuation of application Ser. No. 07/976,900 filed Nov. 16, 1992 abandoned.

BACKGROUND OF THE INVENTION

Compact discs (CD's) on which digital audio signals such as those of music are recorded have gained widespread use. Also introduced are compact disc read-only memories (CD-ROM'S) accommodating not only music data but also image- and computer-related data. Today, there are signal formats extended from the CD-ROM such as CD-ROM-XA (CD-ROM extended architecture) and CD-I (CD-interactive). The CD-ROM-XA format is an extended CD-ROM format that minutely defines how audio and video data are to be recorded. The CD-I format is a format that emphasizes the interactive operation between the medium and users. The audio information complying with the CD-ROM-XA format and the CD-I format is recorded onto discs by adaptive differential pulse code modulation (ADPCM).

FIG. 1 (A) shows a typical data structure of a CD-ROM-XA disc. Illustratively, one track may record up to 255 files of a given size. When audio data are to be recorded, each file may be divided into 16 channels each for use independent of one another, as depicted in FIG. 1 (B). Where image data, text data or computer programs are to be recorded, each file may be divided into 32 channels each for use independent of one another, as indicated in FIG. 1 (C).

FIGS. 2 and 3 show respectively six signal formats and six recording formats in which to record audio data to each file of the CD-ROM-XA disc.

Format a is for stereo recording. With this format, the original stereo audio signal is subjected to A/D conversion at a sampling frequency of 37.8 kHz and with a quantization bit count of 16. The resulting audio data in digital format are compressed by ADPCM into eight bits per sample. As format a in FIG. 3 indicates, the compressed data are recorded on an interleaving basis to every other block in a plurality of blocks (sectors) making up each file.

With format b, the original monaural audio signal is subjected to A/D conversion at a sampling frequency of 37.8 kHz and with a quantization bit count of 16. The resulting audio data in digital format are compressed by ADPCM into eight bits per sample. As format b in FIG. 3 shows, the compressed data are recorded on an interleaving basis to every fourth block in a plurality of blocks constituting each file.

The same workings apply to formats c through f. With any of these formats, the original audio signal is encoded into ADPCM audio data. The resulting audio data are recorded on an interleaving basis in each of the formats c through f.

For normal use, the period per block is 1/75 sec., and the amount of data that may be recorded per block is 2,324 bytes.

Because audio data are recorded on an interleaving basis as depicted in FIG. 3, other data may be recorded to unused blocks. For example, where format a is used to record audio data in interleaving fashion, four-channel stereo recording is available. That is, four languages may be included in a single program. If image data are additionally recorded, the audio signal may be played back accompanied by image reproduction.

Typical image data that may be recorded on CD-ROM-XA discs will now be described with reference to FIGS. 4 through 10.

FIG. 4 is a flowchart of steps in which to record image data in units of frames. FIG. 5 (A) shows a typical image data screen construction for a single frame. The image data for one frame are made of 256 pixels (in traverse direction) by 192 pixels (in longitudinal direction). The red, green and blue for each pixel are represented by five bits each. Each pixel is constituted by 16 bits, i.e, 15 bits (5 bits×3) plus one dummy bit.

In step 81 of FIG. 4, the original image data of one frame shown in FIG. 5 (A) are divided into blocks each measuring 8×8 pixels (each block is called a character), as illustrated in FIG. 5 (B). That is, the image of one frame is split into 768 characters (32×24) CHR(0) through CHR(767). The data on one character CHR(i)(i=0–767) are made of 128 bytes (8 pixels×8 pixels×16 bits).

In step 82, primary vector quantization is performed on the character data CHR(i). The vector quantization executed here involves quantizing the character data so that the number of pixel colors within the character will be limited to a maximum of four. Specifically, in this example, image data are created as follows: A three-dimensional color space is first considered in which the color components of red, green and blue are taken on three coordinate axes that intersect one another orthogonally. In this color space, the distances between the pixels are obtained. Then the pixels whose distances to one another are sufficiently short are grouped together so that the pixel colors within one character are limited to four or fewer representative colors.

The above vector quantization is allowed to continue immediately before a maximum quantization error Emax of each character (i.e., distance between representative color and pixel) is exceeded for each character. The process makes uniform the S/N ratios of all characters (C0 through C767) in each frame. The character data CHR(i) are quantized in this manner, thereby limiting the number of colors in each character to a maximum of four.

In step 83, the quantized character data CHR(i) are categorized into eight groups each comprising characters of like color tones (each group is called a palette). The character data CHR(i) for each character are grouped into one of eight palettes P0 through P7.

In the grouping above, the characters are simply grouped and their sequence is not altered. There is no need for a given palette Pj (j=0 to 7) to be made of contiguous character areas. That is, characters located in a scattered manner may constitute one palette. For example, as shown in FIG. 5 (C), areas A through E of like color tones may each form part of the palette Pj.

In step 84, secondary vector quantization is carried out on the character data CHR(i) grouped into each palette Pj. Even though each character Ci has four or fewer representative colors, the palette Pj comprising characters Ci may have more than 16 colors. If one palette Pj has more than 16 colors, the palette Pj is subjected to secondary vector quantization in the same manner as primary vector quantization so that the number of colors within the palette Pj will be limited to a maximum of 16. The character data CHR(i) belonging to each palette Pj are quantized into the color data (of 15 bits) about one of the 16 representative colors specific to that palette.

In step 85, color number conversion tables COL(j) are created for the palettes Pj. As shown in FIG. 6, the table COL(j) for each pallet Pj is a conversion table that contains the color data (in 15 bits) about the 16 representative colors specific to that palette as well as four-bit color numbers (0–15) for designating the color data. At this point, the character data CHR(i) are equal to one set of character data in the table COL(j) of the palette to which the character data CHR(i) belong.

In step 86, the character data CHR(i) about the respective colors following secondary vector quantization are converted to color numbers in the color number conversion table COL(j) of the palette Pj to which the character CHR(i) belong. The conversion is carried out by reference to the table COL(j). The pixels in each character are represented by two parameters: a four-bit color number designating each color, and data indicating the color number conversion table COL(j) to which the color number belongs.

In step 87, a screen table SCR is created. As illustrated in FIG. 8, the screen table SCR has a total of 768 addresses corresponding to 24×32 characters per frame of the original image data. Each address is two bytes long, as shown in FIG. 9. Of the two bytes, the low-order 10 bits constitute a number Ci indicating a character. The high-order three bits make up a palette number Pj designating the palette Pj to which the character data CHR(i) associated with the character number Ci belong.

In step 88, the character number Ci of the screen table SCR is shifted by 16 in the high-order direction, with character numbers 0 through 15 assigned to the color number of a monochromatic character Ci. For the monochromatic character Ci, the palette number Pj remains the palette number specific to that character but the character number Ci designates the color number. At this point, the address of the monochromatic character Ci in the table SCR indicates the character number Ci.

In the manner described, image data are converted per frame to a color number conversion table COL(j), to a screen table SCR, and to a four-bit color number for each pixel. In the description that follows, the color number conversion table COL(j) will be called the color number conversion table COL, and the four-bit color number for each pixel will be referred to as the color number data PAT. The data PAT, table SCR and table COL may illustratively be combined to form recording data RECD in the format shown in FIG. 10. The recording data are recorded on the CD-ROM-XA disc after undergoing a predetermined encoding process.

The amount of image data RECD recorded per frame is calculated as follows: Eight palettes Pj exist per frame. One palette has 16 colors, each color being represented by 16 bits (of which 1 bit is dummy). Thus the color number conversion table COL is made of a total of 256 bytes (=8 palettes× 16 colors×16 bits). Since there are 768 characters and each character corresponds to two bytes, the screen table SCR amounts to 1,536 bytes (=768 characters=2 bytes). With the color number data DAT comprising four bits per pixel, the amount of data DAT per character is 32 bytes (4 bits×64 pixels). Because the data about a monochromatic character Ci are already transmitted as part of the screen table SCR, it is not necessary to transmit the data anew. Thus if a quarter of the 768 characters per frame are monochromatic characters and the remaining three fourths are multi-colored characters, the total data amount is obtained by adding 256 bytes of the color number conversion table COL, 1,536 bytes of the screen table SCR, and 18,432 bytes of the color number data DAT (=32 bytes×768 characters×¾). The sum is 20,224 bytes.

Where image data RECD are to be recorded on the CD-ROM-XA disc, all 32 channels may be used to record the data, as shown in FIG. 1 (C). At this time, the transmission rate of the CD-ROM-XA disc for the image data RECD is 174,300 bytes (=2,324 bytes×75 blocks) per second. In this example, the frame count per second is about 8.6 (=174,300 bytes divided by 20,224 bytes). Animated images are recorded and reproduced with this frame count.

As illustrated in FIG. 1, each file on the CD-ROM-XA disc may record audio data and image data mixedly in units of blocks. Where a computer game is executed from recordings on a CD-ROM-XA disc, background music (BGM) and sound effects may be reproduced concurrently to enhance the entertainment value of the game. Illustratively, format e in FIG. 2 or 3 is utilized so that one out of eight blocks will address audio data and the remaining seven will address image data RECD. In this manner, both music and animated images are reproduced at the same time.

Because seven out of eight blocks are used to record and reproduce image data RECD in the above example, the frame count per second for the image data RECD is about 7.5 (8.6 frames×⅞). That frame count is insufficient for the adequate display of animated images. This drawback is circumvented illustratively by raising the revolutions of the disc. Rotating at higher speeds, the disc increases the number of image frames per second for animation. Illustratively, doubling the standard revolutions of the disc doubles the rate of data reproduction therefrom. That is, with the standard disc rotating speed doubled, the frame count is about 15 (=7.5 frame×2) per second, which is sufficient for animated image reproduction. Descriptions of how data are recorded and reproduced to and from a disc at a rotating speed higher than usual are found illustratively in a pending international application, "Data Recording and Reproducing Method" (by Yoichiro Sako, Serial No. PCT/JP91/00054, filed Jan. 18, 1991).

As described, concurrent recording of audio data and animated image data on a disc should preferably be done by raising the disc revolutions (e.g., twice as fast as standard rotating speed). This scheme involves one disadvantage. That is, to double the disc revolutions requires lowering in half the frequency of the original audio signal as the signal is subjected to ADPCM for audio data preparation. Optimum encoding of the audio signal is disabled at this point, with the result that the sound quality of the reproduced audio signal deteriorates.

SUMMARY OF THE INVENTION

It is therefore an object of the present invention to provide an optical disc and a method for successfully reproducing audio signals in data compressed format from that disc rotating at a speed higher than usual.

In carrying out the invention and according to one aspect thereof, there is provided an optical disc on which an audio signal is recorded in the form of compressed data, the optical disc comprising: an identification area for identifying the data transfer rate of the optical disc; and an audio recording area in which compressed data are interleaved and arranged in accordance with the data transfer rate.

According to another aspect of the invention, there is provided a method for recording an audio signal on a disc in the form of compressed data, the method comprising the steps of: identifying the data transfer rate of compressed audio data; arranging the compressed audio data after interleaving thereof on the disc in accordance with the data transfer rate; and arranging identification data on the disc for identifying the data transfer rate of the recorded audio signal for use in data reproduction.

According to a further aspect of the invention, there is provided a method for reproducing a compressed audio signal from a disc, the method comprising the steps of: identifying the data transfer rate of a recorded audio signal; rotating the disc in accordance with the identified data transfer rate; and reproducing the compressed audio signal from the disc, the compressed audio signal being interleaved and arranged on the disc in accordance with the data transfer rate.

The invention establishes the interleaving factor for compressed audio data in accordance with the rotating speed of the disc which is greater than that of CD-ROM discs commonly used. For example, where the rotating speed of the disc is twice as high as the standard rotating speed of discs, the interleaving factor for compressed audio data is doubled for recording onto the disc.

The above and other related objects and features of the invention, as well as the novelty thereof, will clearly appear from the following description and from the accompanying drawings.

BRIEF DESCRIPTION OF THE DRAWINGS

FIG. 2 is a view listing typical signal formats of a disc;

FIG. 3 is a view listing typical recording formats of a disc;

FIG. 11 is a view listing typical recording formats according to the invention;

DESCRIPTION OF THE PREFERRED EMBODIMENT

FIG. 11 lists typical recording formats according to the invention. It is assumed that a CD-ROM-XA disc, used in the example below, rotates at a speed twice as high as the standard rotating speed of discs for recording and reproducing. In FIG. 11, formats a through f correspond to the formats a through f of FIGS. 2 and 3. That is, format a of the invention is also for stereo recording. With this format, the original stereo audio signal is subjected to A/D conversion at a sampling frequency of 37.8 kHz and with a quantization bit count of 16. The resulting audio data in digital format are compressed by ADPCM into eight bits per sample. The compressed audio data are recorded on an interleaving basis to every fourth block.

Format b is for monaural recording. With format b, the original monaural audio signal is subjected to A/D conversion at a sampling frequency of 37.8 kHz and with a quantization bit count of 16. The resulting audio data in digital format are compressed by ADPCM into eight bits per sample. As format b in FIG. 3 shows, the compressed audio data are recorded on an interleaving basis to every eighth block.

The same workings apply to formats c through f. The audio signal is encoded into ADPCM audio data in each of these signal formats shown in FIG. 2. The resulting audio data are recorded on an interleaving basis in each of the recording formats c through f of FIG. 11. That is, the block interleaving factor for audio data according to the invention is twice that of CD-ROM-XA discs that rotate at the standard speed.

Figure 1:
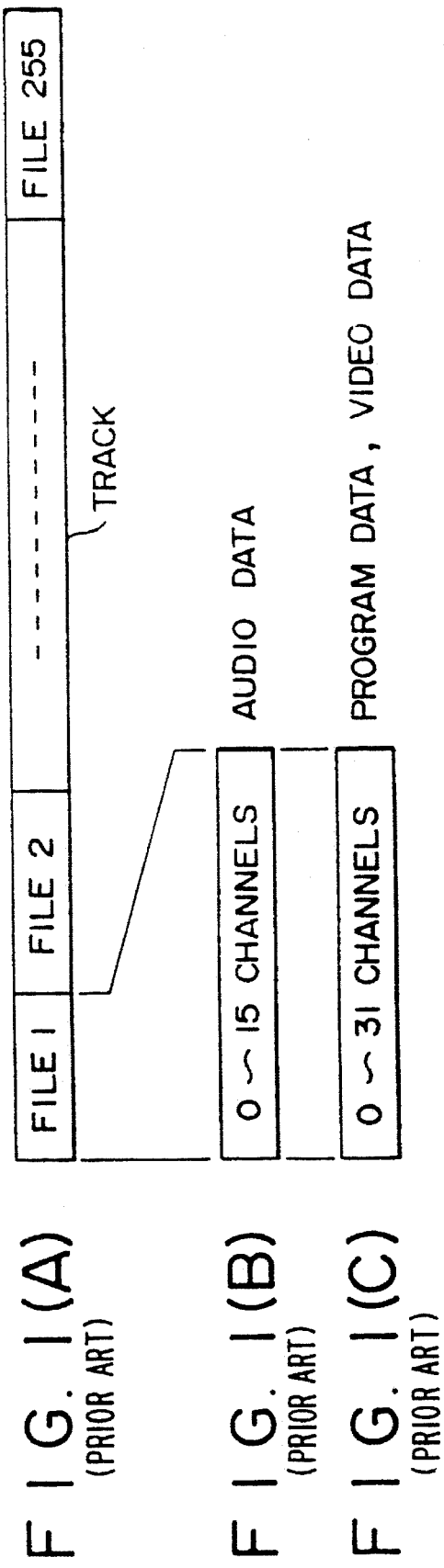
FIGS. 1(A)-1(C) is a set of views depicting a typical track format of a disc.
Figure 4:
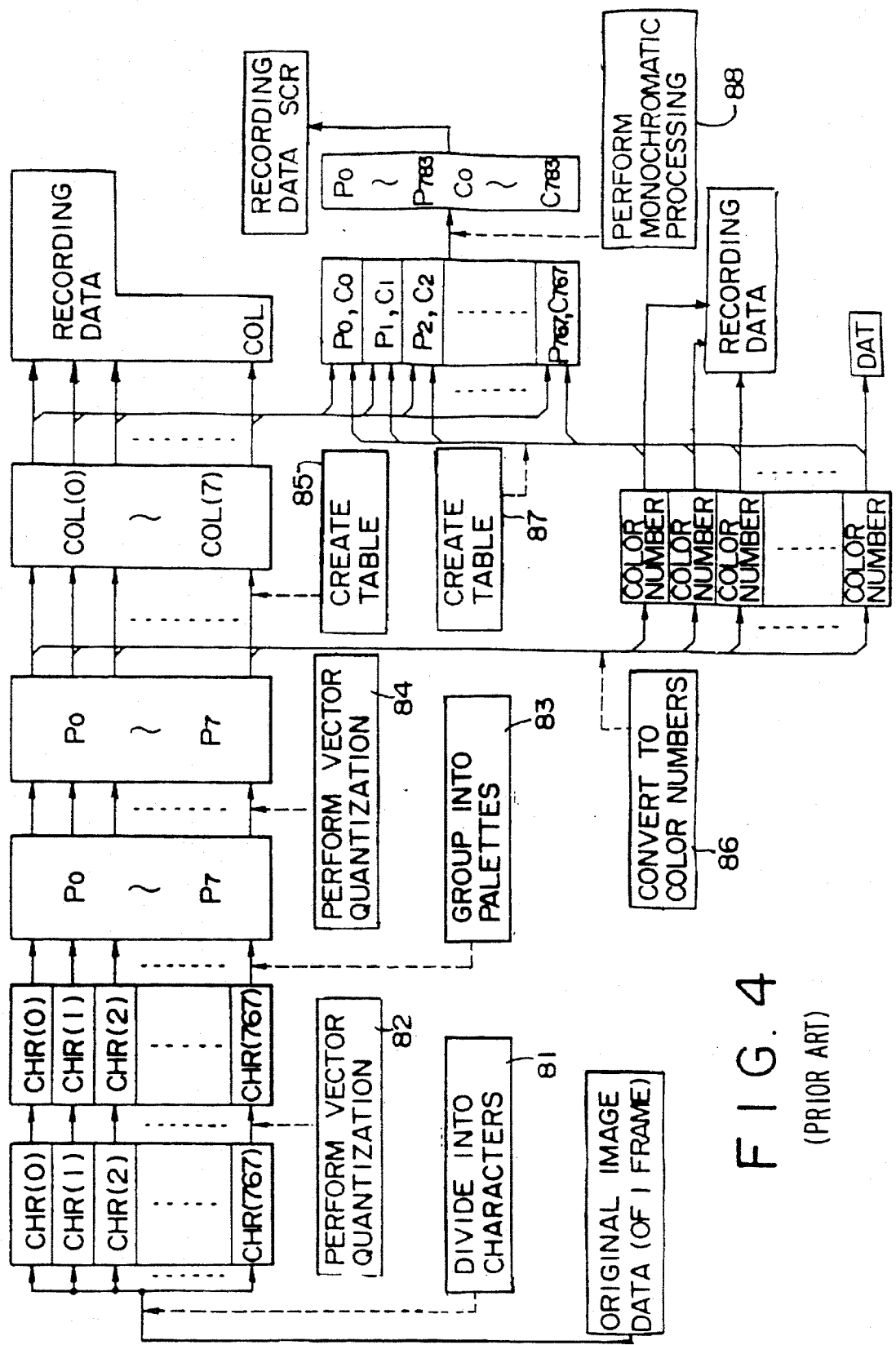
FIG. 4 is a flowchart of key steps in which to record and process image data.
Figure 5A:
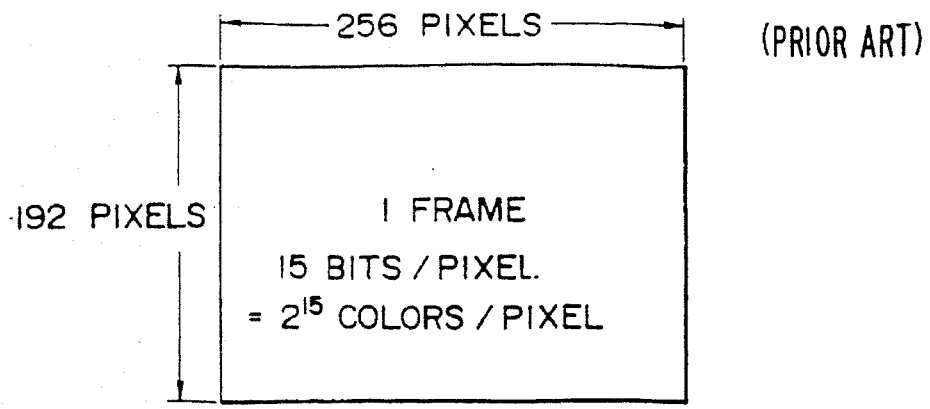
FIGS. 5(A)-5(C) is a set of views illustrating a typical image data structure.
Figure 5B:
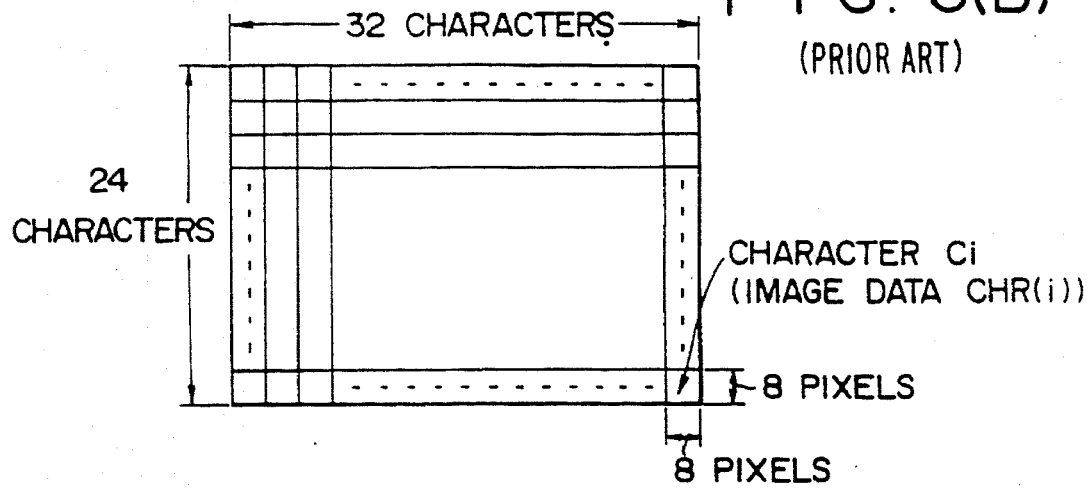
Figure 5C:
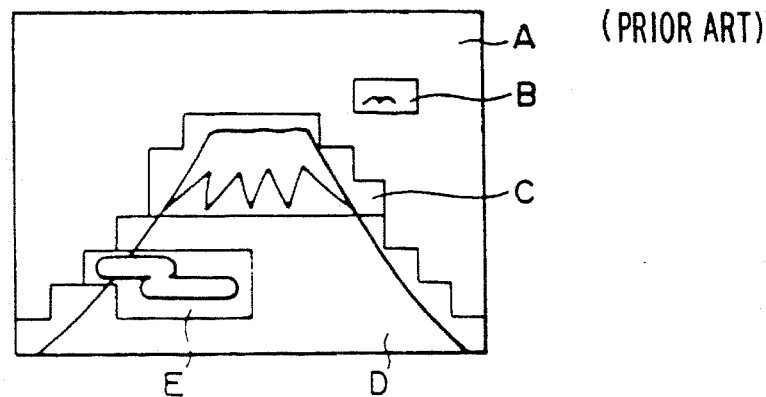
Figures 6, 7:
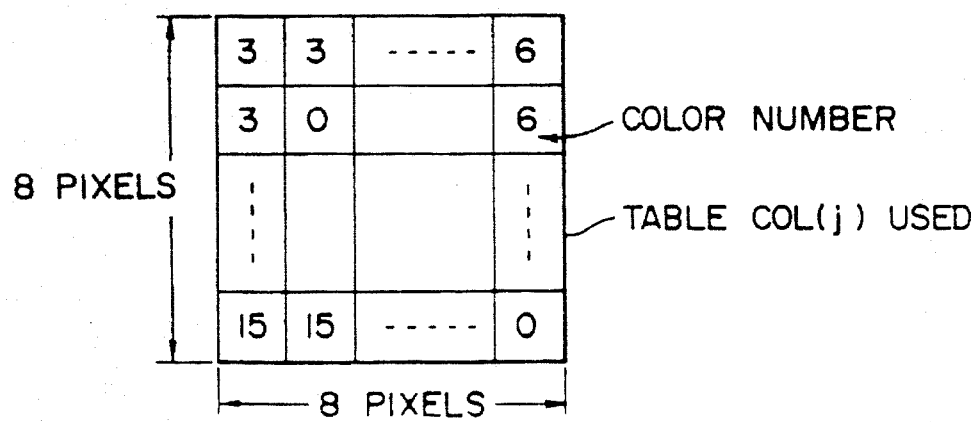
FIG. 6 is a view showing color number conversion tables.
FIG. 7 is a view depicting a typical pixel structure.
Figure 8:
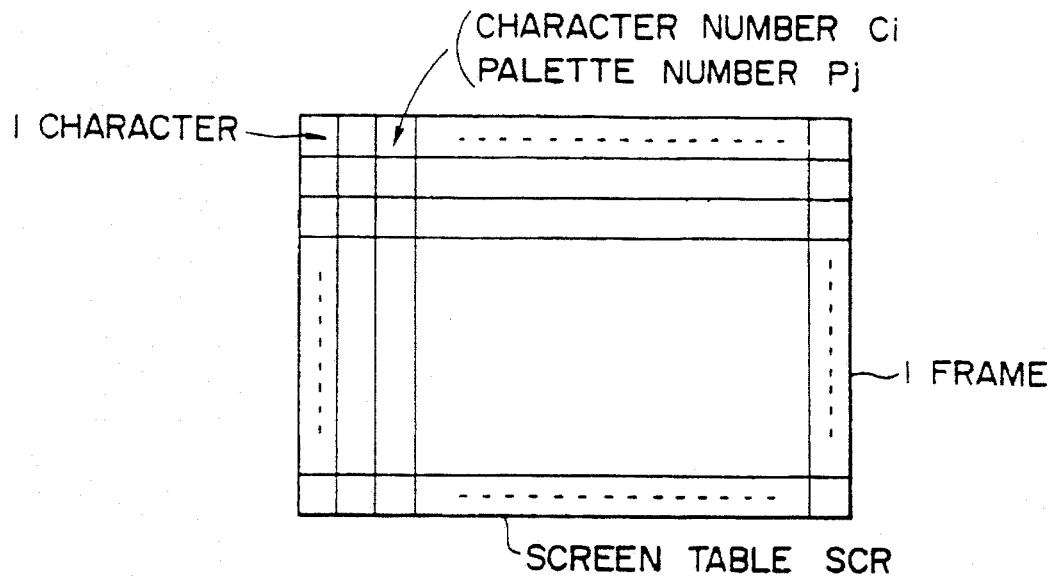
FIG. 8 is a view portraying how a typical screen table is constructed.
Figure 9:
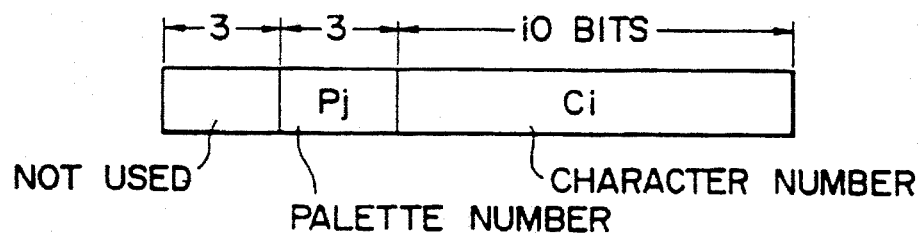
FIG. 9 is a view explaining how screen table data are typically structured.
Figure 10:
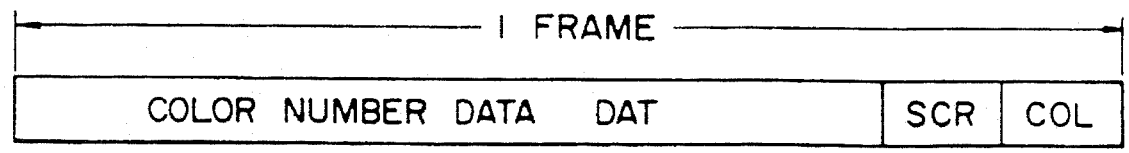
FIG. 10 is a view showing a typical format of recorded data.
Figure 12A:
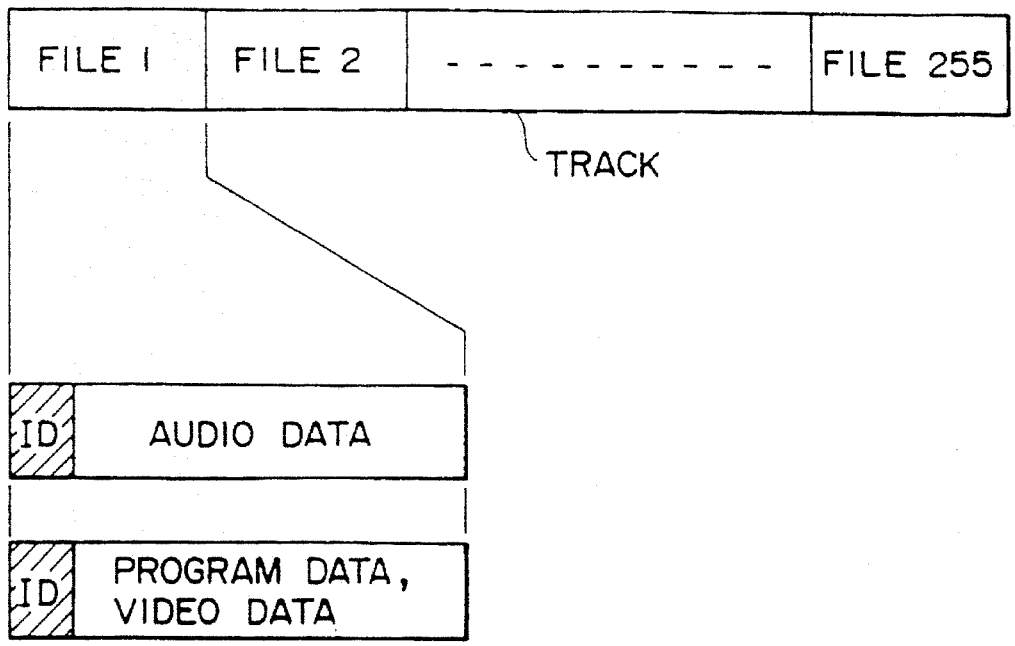
FIGS. 12(A)-12(B) is a set of views indicating the locations of ID codes that designate the data transfer rate of a disc according to the invention.
Figure 12B:
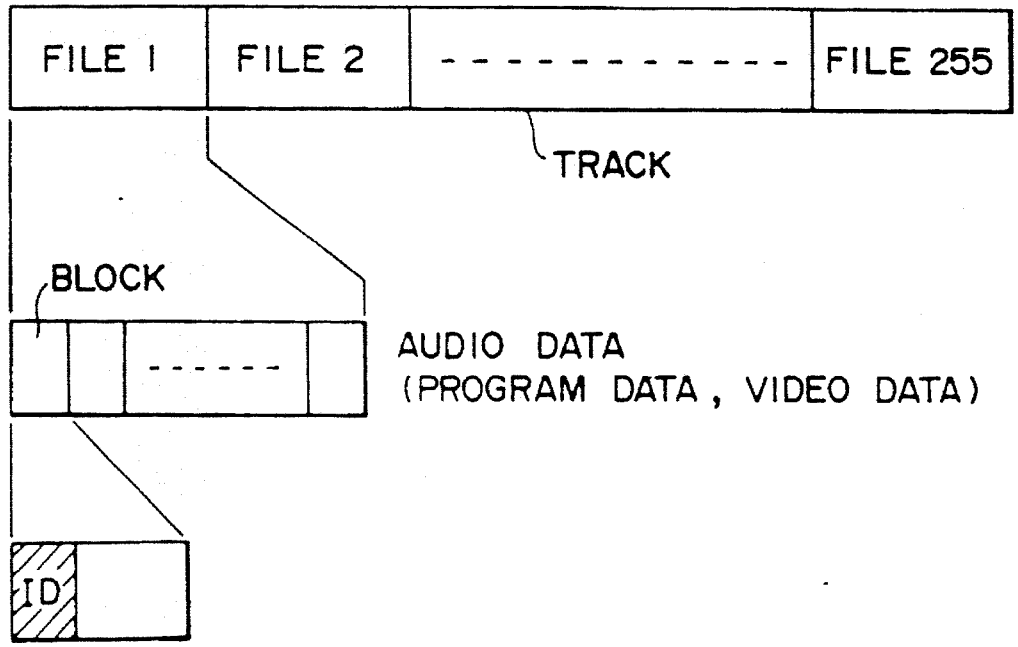

When the rotating speed of the CD-ROM-XA disc is twice the standard rotating speed, the block period is 1/150 sec. As shown in FIG. 12 (A), the CD-ROM-XA disc with its rotating speed doubled has each of its files prefixed with an identification code indicating the disc rotating speed or data transfer rate. Alternatively, as depicted in FIG. 12 (B), each block is prefixed with an identification code indicating whether the rotating speed is standard or twice as high.

According to this recording format, the original audio signal to be recorded on a CD-ROM-XA disc rotating at double the standard rotating speed is encoded into audio data through the same ADPCM process as with a CD-ROM-XA disc rotating at the standard rotating speed. The audio data are recorded to each of the blocks. As the rotating speed or data transfer rate of the disc is enhanced, the interleaving factor for the compressed audio data is raised accordingly. This eliminates the need for specialized circuits for lowering the frequency of the audio signal in inverse proportion to the disc rotating speed.

Referring to FIG. 3, when seven blocks out of the eight are to be used to record image data RECD, the formats of the invention in FIG. 11 allow 15 blocks out of the sixteen to record the image data RECD. Because the number of animated image frames is increased in this manner, the resulting animation is seen moving naturally.

Figure 13:
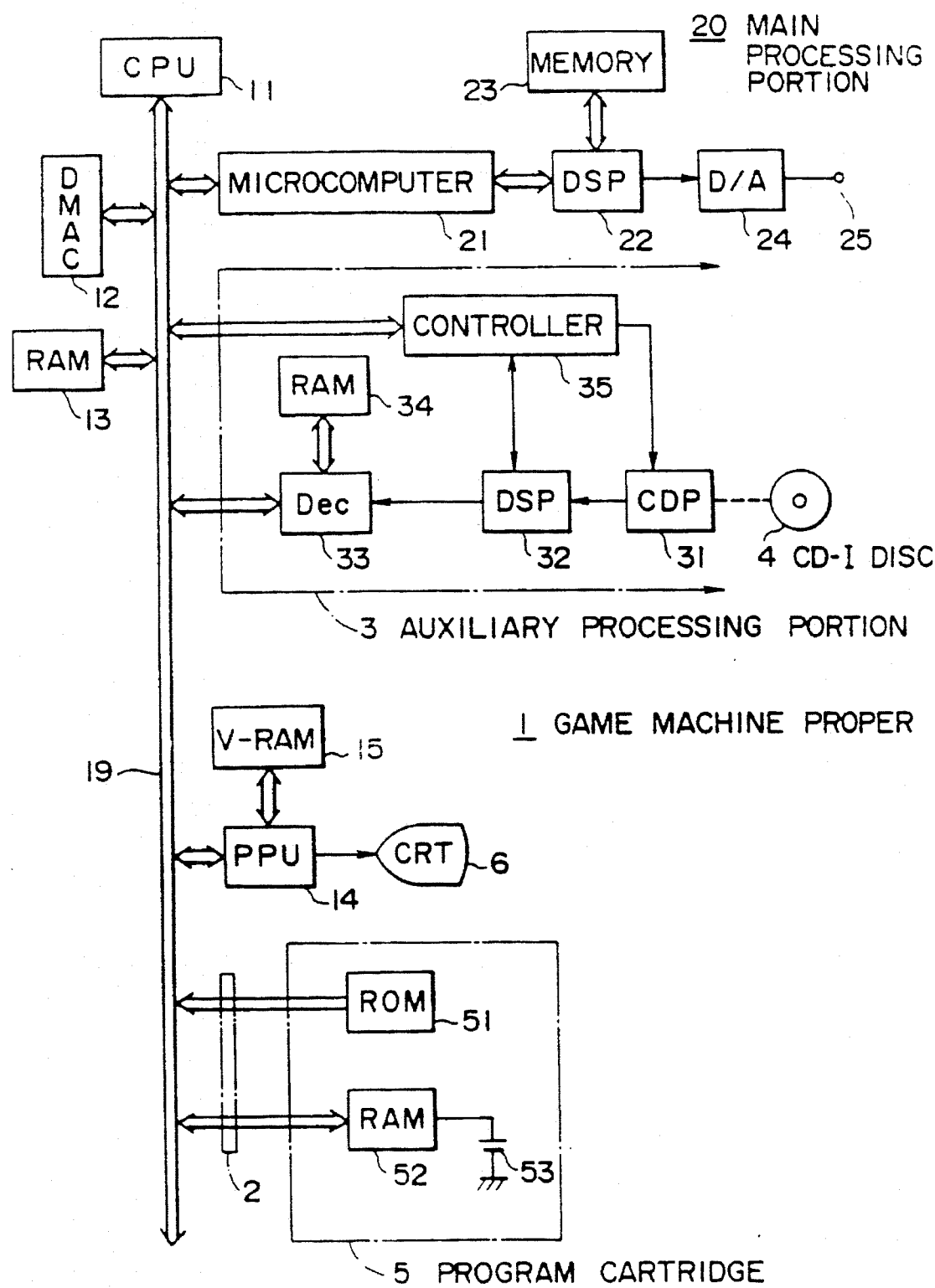
FIG. 13 is a schematic diagram of a disc reproducing circuit according to the invention.

FIG. 13 is a schematic diagram of a disc reproducing circuit according to the invention, the circuit being incorporated in a computer game machine operating off a CD-ROM-XA disc.

In FIG. 13, the game machine proper 1 is based on a microcomputer system, wherein reference numeral 11 is a CPU; 12 is a DMAC (DMA controller); 13 is a RAM for work area and buffer use; 14 is a PPU (picture processing unit); and 15 is a video RAM.

The circuits 11 through 14 are connected to a system bus 19. The PPU 14 is connected to the video RAM 15 and a CRT display 6. The video RAM 15 has screen areas corresponding to at least two frames (2 screens). The image data of one such screen area are read out by the PPU 14 in synchronism with the vertical and horizontal scanning of the CRT display 6, the read-out image data being displayed on the CRT display 6. While the display is on, the image data of the image to be displayed next are written to another screen area. Part of the areas of the video RAM 15 is used as a work area for use by the PPU 14; part of them is also used as a palette area for use by the color number conversion table COL.

In the game machine proper 1, reference numeral 20 is a main processing portion that addresses audio data; 21 is a microcomputer for control of the main processing portion 20; 22 is a DSP (digital signal processor) dedicated to audio data processing; 23 is a cache memory for use with the DSP 22; 24 is a D/A converter; and 25 is an audio output terminal. The DSP 22 is connected to the system bus 19 via the microcomputer 21 and also to the D/A converter 24. The DSP 22 is further connected to the cache memory 23. An auxiliary processing portion 3 comprises a CD player 31 that permits the use of a CD-ROM-XA disc 4. Reference numeral 32 is a DSP; 33 is a CD-ROM decoder; 34 is a work area RAM for use by the CD-ROM decoder 33; and 35 is a controller. As described, the CD-ROM-XA disc 4 contains thereon audio data, image data RECD, programs for reproducing and processing the image data RECD, game programs, and the operating system (OS). The DSP 32 corrects errors in the reproduced signal from the CD player 31. At the same time, the DSP 32 separates from the reproduced signal user-oriented data such as image data RECD and control data such as track numbers. Based on the control data from the DSP 32 and on the data from the CPU 11, the controller 35 controls the CD player 31 so as to retrieve target data from the disc 4. Depending on whether the reproduced signal from the CD player 31 is a signal from the CD-ROM-XA disc 4 or from a CD-ROM disc, the decoder 33 performs error correction and other processing regarding the applicable disc.

In the example of FIG. 13, the auxiliary processing portion 3 includes a general-purpose DSP 44 that shoulders part of the processing burdens of the CPU 11. Although the auxiliary processing portion 3 is integrally attached to the game machine proper 1, the portion 3 may alternatively be provided as an adapter that is removably mounted on the game machine 1.

A program cartridge 5 contains a ROM 51 and a RAM 52. The ROM 51 contains programs and other data. The RAM 52, backed up by a battery 53, retains the data about a game interrupted halfway through so that the game will be resumed later where it was left off. When the program cartridge 5 is inserted into a slot 2 of the game machine proper 1, the ROM 51 and RAM 52 are connected to the bus 19 via connectors, not shown. If the program cartridge 5 alone is sufficient for executing a game or like computer-based program, the target game is started by setting the cartridge 5 in the slot 2 and by turning on or resetting power to the game machine 1.

Upon power-up, the CPU 11 executes the program in the ROM 51 to generate image data. The PPU 14 writes the generated image data to the video RAM 15. The image data in the video RAM are read out therefrom in synchronism with the horizontal and vertical scanning for graphic display onto the CRT display 6.

The CPU 11 loads audio data and a program for decoding the data into the microcomputer 21. In turn, the microcomputer 21 decodes the audio data into a digital audio signal which is converted from digital to analog format by the converter 24. The converted analog audio signal is output from the terminal 25.

Where the CD-ROM-XA disc 4 is used to execute a game or like computer-based program, the disc 4 is first set to the CD player 31 of the auxiliary processing portion 3. Then a system cartridge 5 (i.e., program cartridge) is set in the slot 2. The system cartridge 5 also has the ROM 51 and RAM 52. The ROM 51 contains an IPL (initial program loader). The RAM 52, as described, retains the data about a game interrupted halfway through so that the game will be resumed later where it was left off. The CD-ROM-XA disc 4 includes the OS (operating system) under which the disc 4 is run as well as the game program.

For operation, applying power causes the CPU 11 to execute the IPL in the ROM 51. This in turn causes the OS and game program to be loaded from the CD-ROM-XA disc 4 to the RAM 13. Then the CPU 11 executes the program loaded in the RAM 13, allowing the user to play the game.

Figure 14:
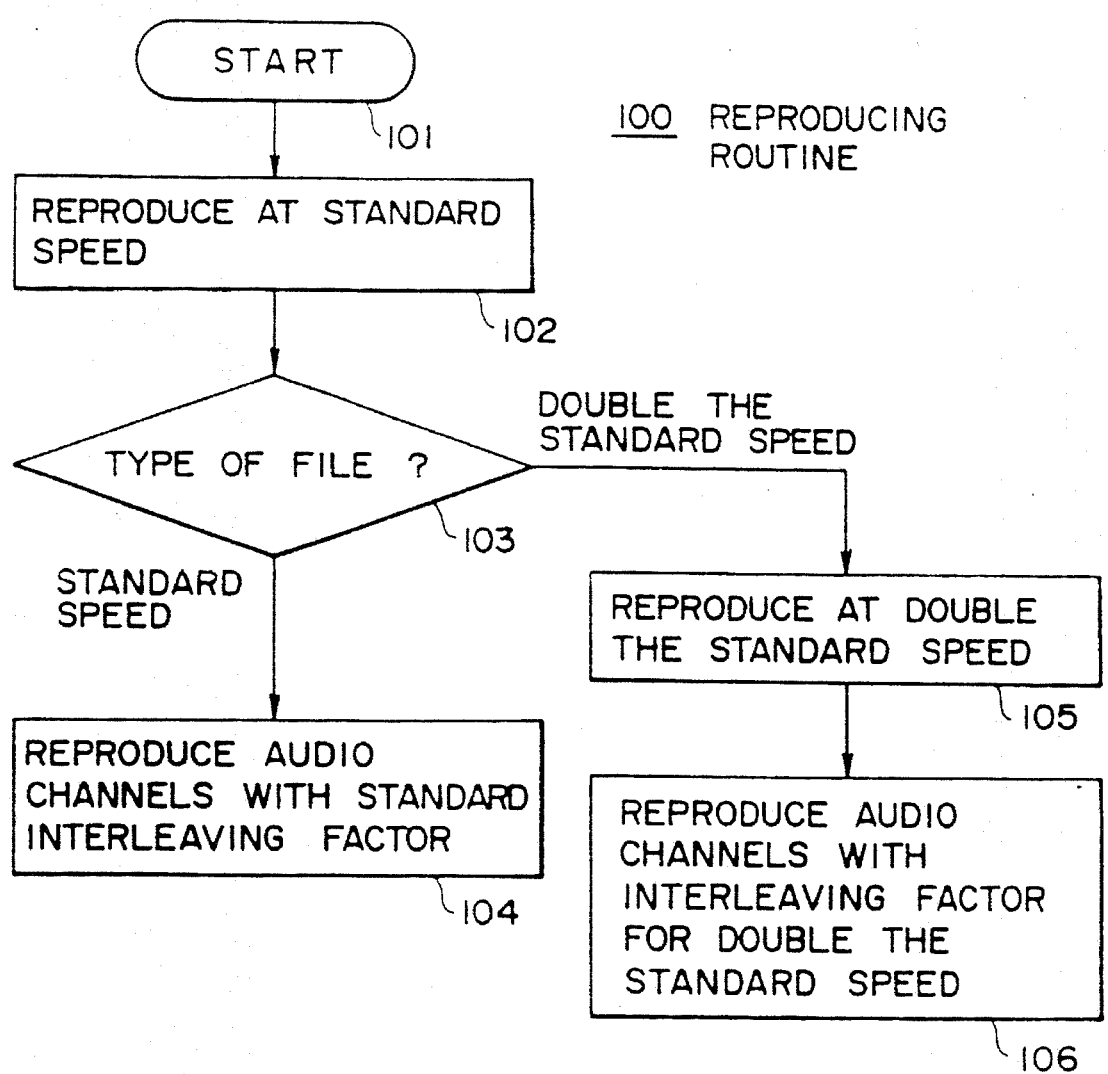
FIG. 14 is a flowchart of key steps in a disc reproducing routine according to the invention.

FIG. 14 is a flowchart of key steps in a disc reproducing routine 100 for use with the CD-ROM-XA disc 4. The routine 100 is executed illustratively when the game program is loaded from the CD-ROM-XA disc 4 by the CPU 11 executing the IPL in the ROM 51.

With the IPL executed by the CPU 11, the processing of the CPU 11 goes from step 101 to step 102 of the routine 100. In step 102, the CD-ROM-XA disc 4 is set temporarily in standard rotating speed reproduction mode. In step 103, the identification code at the beginning of the file to be reproduced is checked to see what the code indicates: whether the file to be reproduced is to be read at the standard rotating speed, or at a higher rotating speed.

If the check in step 103 has revealed that the identification code indicates a standard rotating speed file, step 103 is followed by step 104. In step 104, the CD-ROM-XA disc 4 is reproduced at the standard rotating speed.

If the check in step 103 has revealed that the identification code indicates a file readable at a higher speed (e.g., double the standard rotating speed), step 103 is followed by step 105. In step 105, the CD-ROM-XA disc 4 is rotated illustratively at double the standard rotating speed. In step 106, the interleaving process for reproducing the audio data is carried out with double the interleaving factor according to FIG. 11.

Where one file mixedly contains both blocks for the standard rotating speed and blocks for double the standard rotating speed, each of the blocks is checked for its identification code. This allows each block to be identified with its applicable rotating speed and interleaving factor regarding the CD-ROM-XA disc 4.

When image data RECD of the CD-ROM-XA disc 4 are to be displayed as animated images, the image data RECD are reproduced and processed as follows:

(1) The CD player 31 reproduces one frame of image data RECD from the CD-ROM-XA disc 4. The image data RECD are fed from the CD player 31 to the DSP 32 and on to the decoder 33 for error correction and other processing. After error correction, the image data RECD are transferred through DMA by the DMAC 12 from the decoder 33 to the video buffer area of the RAM 13.

(2) Of the image data RECD transferred through DMA to the buffer area of the RAM 13, the color number data DAT are sent by the DMAC 12 through DMA transfer to the video RAM 15 via the PPU 14 during a vertical blanking period of the CRT display 6

(3) After the process (2) above, of the image data RECD sent through DMA transfer to the buffer area of the RAM 13, the screen table SCR is transferred through DMA by the DMAC 12 to the video RAM 15 via the PPU 14 during a vertical blanking period of the CRT display 6.

(4) Of the image data RECD sent through DMA transfer to the buffer area of the RAM 13, the color number conversion table COL is transferred by the DMAC 12 through DMA to the video RAM 15 via the PPU 14 during a horizontal blanking period of the CRT display 6.

(5) After the above processes, the PPU 14 converts the color number data PAT transferred in (2) above into pixel data of actual color by referencing the color number conversion table COL(j) in real time. At the same time, by referencing the screen table SCR, the PPU 14 writes the pixel data to the addresses corresponding to the original character positions in the video RAM 15.

(6) After one frame of pixel data is written to the video RAM 15 in the manner above, display areas of the video RAM 15 are switched. The area filled with the image data is rendered active, and the image in the active area is displayed on the CRT display 6.

(7) The process (1) above is reached again, and the processes (1) through (6) are repeated for each frame.

Thus the image data reproduced from the CD-ROM-XA disc 4 are sent consecutively from the RAM 13 through the PPU 14 to the video RAM 15. The PPU 14 retrieves and suitably processes the image data. As a result, the animated images based on the image data RECD from the CD-ROM-XA disc 4 are displayed on the CRT display 6.

When audio data from the CD-ROM-XA disc 4 are to be output as an audio signal to the terminal 25, the audio data are reproduced and processed as follows:

(1) The CD player 31 reproduces one block of audio data from the CD-ROM-XA disc 4. The audio data are supplied from the CD player 31 to the DSP 32 and on to the decoder 33 for error correction and other processing. After error correction, the audio data are sent by the DMAC 12 from the decoder 33 to the audio buffer area of the RAM 13 through DMA transfer.

(2) The audio data transferred through DMA to the buffer area of the RAM 13 are sent further to the memory 23 via the microcomputer 21 and DSP 22.

(3) With the process (2) above completed, the DSP 22 decodes the audio data in the memory 23 from ADPCM format back to the original audio data.

(4) The audio data decoded in the process (3) above are fed to the D/A converter 24. This allows the original audio signal to be output to the terminal 25.

(5) The process (1) is reached again. Thereafter, the processes(1) through (4) are repeated for each block of audio data.

The audio data thus reproduced from the CD-ROM-XA disc 4 are sent as continuous audio signals to the terminal 25.

For the example of CD-ROM-XA formats above, the rotating speed of the CD-ROM-XA disc is twice the standard rotating speed. Alternatively, the disc rotating speed or data transfer rate may be N (N>1) times the standard speed or standard rate. In the latter case, the standard interleaving factor for recording audio data on an interleaving basis need only be multiplied by a factor of N.

In the above example, the identification code indicating the rotating speed of the CD-ROM-XA disc 4 is attached to each file or to each block, as shown in FIG. 12. Alternatively, the identification code may be attached to the TOC (table of contents) area of the disc.

As many apparently different embodiments of this invention may be made without departing from the spirit and scope thereof, it is to be understood that the invention is not limited to the specific embodiments thereof except as defined in the appended claims.

What is claimed is:

1. An optical disc on which an audio signal in the form of compressed data is recorded along with a video signal, said optical disc comprising:

an identification area containing identification data for identifying a particular one of two different data transfer rates of said optical disc, a first one of said two different data transfer rates corresponding to a first disc rotation speed and a second one of said two different data transfer rates corresponding to a second disc rotation speed which is twice as fast as said first disc rotation speed; and a data recording area in which said compressed data are interleaved with said video signal, compressed data interleaved with said video signal which have said corresponding first one of said two different data transfer rates corresponding to said first disc rotation speed having a first interleaving factor, and compressed data interleaved with said video signal which have said corresponding second one of said two different data transfer rates corresponding to said second disc rotation speed having a second interleaving factor that is double said first interleaving factor.

2. An optical disc as claimed in claim 1 wherein said audio signal is compressed by means of adaptive differential pulse code modulation.

3. An optical disc on which an audio signal in the form of compressed data is recorded along with a video signal as a plurality of files, said optical disc comprising:

an identification area at a front end of each of said plurality of files containing identification data for identifying a particular one of two different data transfer rates of said optical disc, a first one of said two different data transfer rates corresponding to first disc rotation speed and a second one of said two different data transfer rates corresponding to a second disc rotation speed which is twice as fast as said first disc rotation speed; and a data recording area for holding said plurality of files, said compressed data being interleaved with said video signal in each of said plurality of files, compressed data interleaved with said video signal which have said corresponding first one of said two different data transfer rates corresponding to said first disc rotation speed having a first interleaving factor, and compressed data interleaved with said video signal which have said corresponding second one of said two different data transfer rates corresponding to said second disc rotation speed having a second interleaving factor that is double said first interleaving factor.

4. An optical disc on which an audio signal in the form of compressed data is recorded along with a video signal as a plurality of data blocks within respective ones of a plurality of files, said optical disc comprising:

an identification area at a front end of each of said plurality of data blocks containing identification data for identifying a particular one of two different data transfer rates of said optical disc, a first one of said two different data transfer rates corresponding to a first disc rotation speed and a second one of said two different data transfer rates corresponding to a second disc rotation speed which is twice as fast as said first disc rotation speed; and a data recording area for holding said plurality of files, said compressed data being interleaved with said video signal in each of said plurality of files, compressed data interleaved with said video signal which have said corresponding first one of said two different data transfer rates corresponding to said first disc rotation speed having a first block interleaving factor, and compressed data interleaved with said video signal which have said corresponding second one of said two different data transfer rates corresponding to said second disc rotation speed having a second block interleaving factor that is double said first block interleaving factor.

* * * * *

UNITED STATES PATENT AND TRADEMARK OFFICE
CERTIFICATE OF CORRECTION

PATENT NO. : 5,539,716

DATED : July 23, 1996

INVENTOR(S) : Makoto FURUHASHI

It is certified that error appears in the above-identified patent and that said Letters Patent is hereby corrected as shown below:

Col. 3, line 52, change "=" second occurence, to --x--

In the Claims:

Col. 10,
line 58, delete "block"
line 62, delete "block"
line 63, delete "block".

Signed and Sealed this

Twenty-seventh Day of May, 1997

Attest:

BRUCE LEHMAN

Attesting Officer

Commissioner of Patents and Trademarks